(12) United States Patent
Murata et al.

(10) Patent No.: US 7,731,201 B2
(45) Date of Patent: Jun. 8, 2010

(54) WORK FIXING DEVICE

(75) Inventors: Shigeo Murata, Amagasaki (JP); Naoto Hata, Amagasaki (JP); Yoshiaki Takada, Amagasaki (JP)

(73) Assignee: Nihon Spindle Mfg. Co., Ltd., Hyogo (JP)

( * ) Notice: Subject to any disclaimer, the term of this patent is extended or adjusted under 35 U.S.C. 154(b) by 1005 days.

(21) Appl. No.: 11/447,129

(22) Filed: Jun. 6, 2006

(65) Prior Publication Data
US 2006/0290043 A1 Dec. 28, 2006

(30) Foreign Application Priority Data
Jun. 10, 2005 (JP) ............... 2005-170815
Feb. 28, 2006 (JP) ............... 2006-052819

(51) Int. Cl.
*B23B 31/163* (2006.01)
(52) U.S. Cl. .................. 279/114; 269/233
(58) Field of Classification Search ......... 279/114–116; 269/233; B23B 31/163
See application file for complete search history.

(56) References Cited

U.S. PATENT DOCUMENTS

| | | | | |
|---|---|---|---|---|
| 730,123 A | * | 6/1903 | Hudson | 408/106 |
| 1,181,845 A | * | 5/1916 | Church | 279/116 |
| 1,219,439 A | * | 3/1917 | Church | 279/115 |
| 1,578,364 A | * | 3/1926 | Recen | 81/128 |
| 3,026,128 A | * | 3/1962 | Willis | 285/18 |
| 4,041,612 A | * | 8/1977 | Skubic | 279/114 |
| 4,576,254 A | * | 3/1986 | Cox | 188/67 |
| 4,718,682 A | * | 1/1988 | Zilic et al. | 279/116 |
| 6,220,608 B1 | * | 4/2001 | Varnau | 279/114 |

FOREIGN PATENT DOCUMENTS

| | | | |
|---|---|---|---|
| DE | 3338140 A1 | * | 5/1985 |
| SU | 1291299 A1 | * | 2/1987 |
| SU | 1463401 A1 | * | 3/1989 |

* cited by examiner

*Primary Examiner*—Eric A Gates
(74) *Attorney, Agent, or Firm*—Wenderoth, Lind & Ponack, L.L.P.

(57) ABSTRACT

A work fixing device capable of stably fixing the work, without any biasing, in the longitudinal direction of the work, of the fastening force for fixing the work. The moving mechanism of clamps is constructed by comprising a scroll disc as working disc forming a circular hole in which to insert the work at the center and scroll guides in spiral shape the winding direction of which is opposite to each other from the center toward the outer circumference on the both side faces, a rotary drive mechanism for rotatably driving this scroll disc, and scroll pieces having a fitting portion to be engaged with the scroll guides of the scroll disc and disposed on both sides of the scroll disc in a way to correspond to a plurality of clamps respectively.

12 Claims, 11 Drawing Sheets

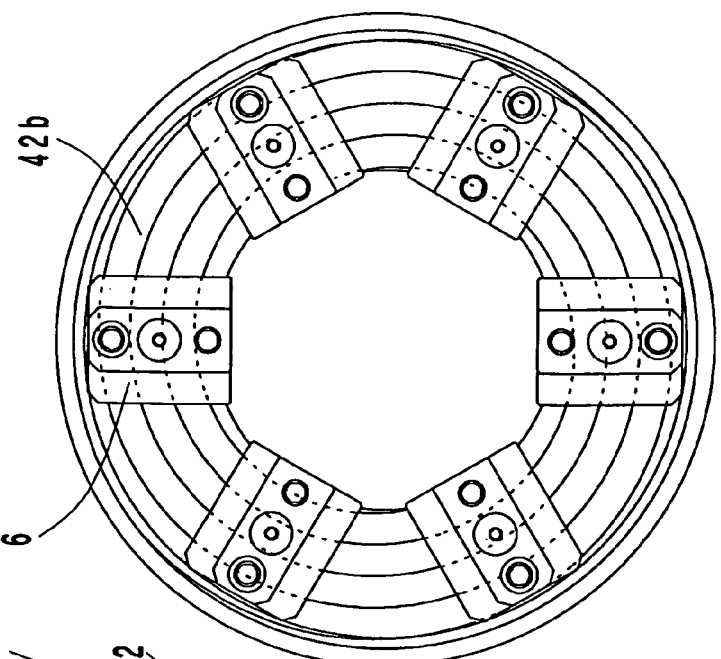
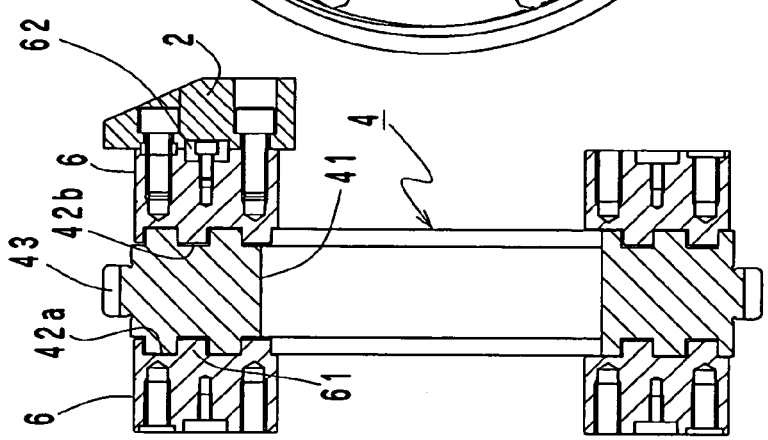
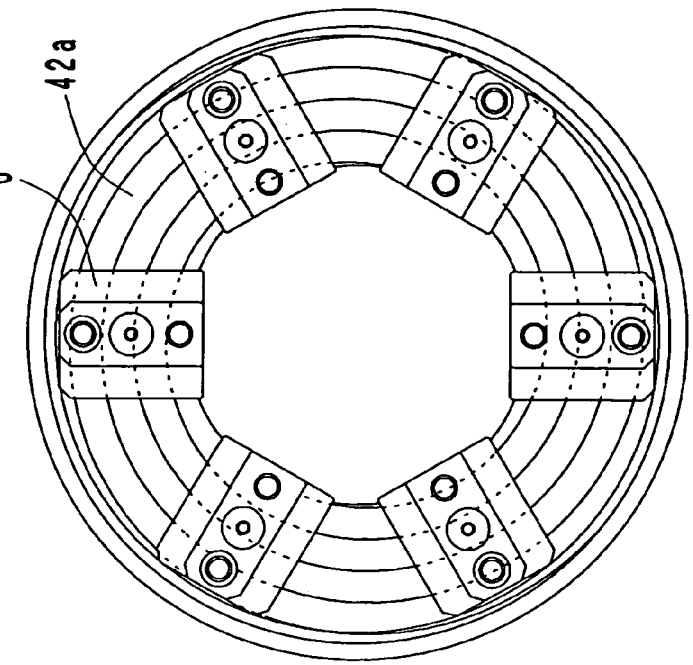

FIG. 7A
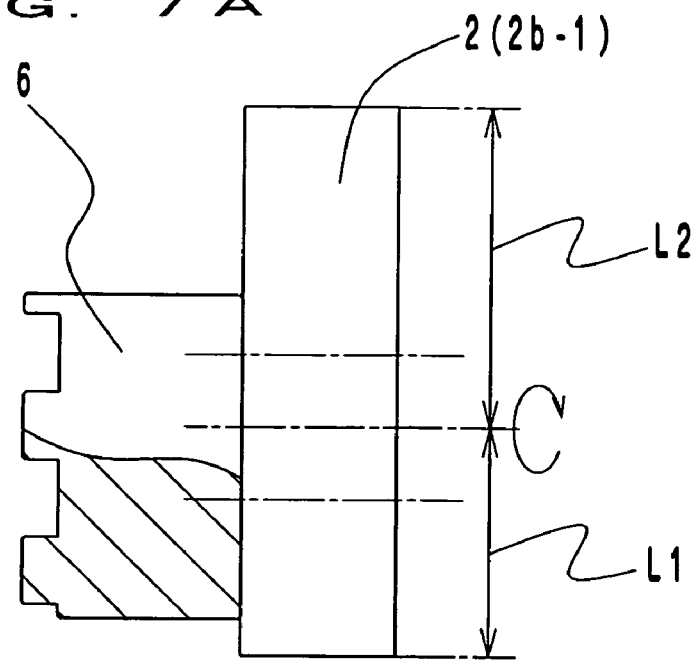
FIG. 7B1   FIG. 7B2
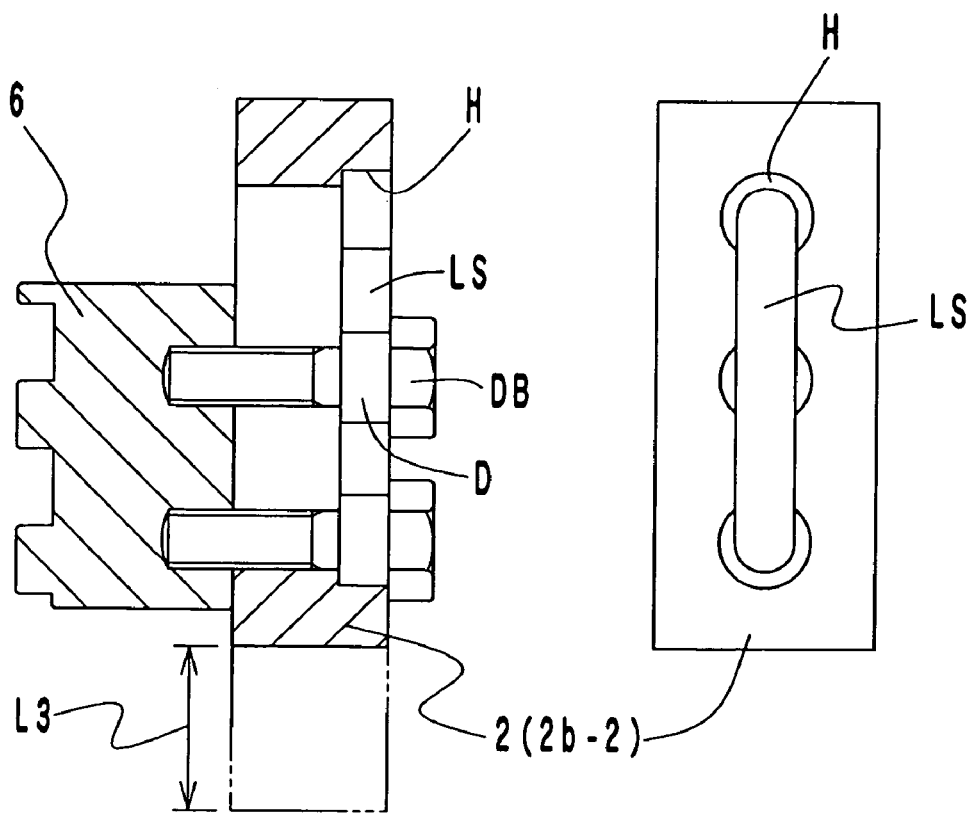

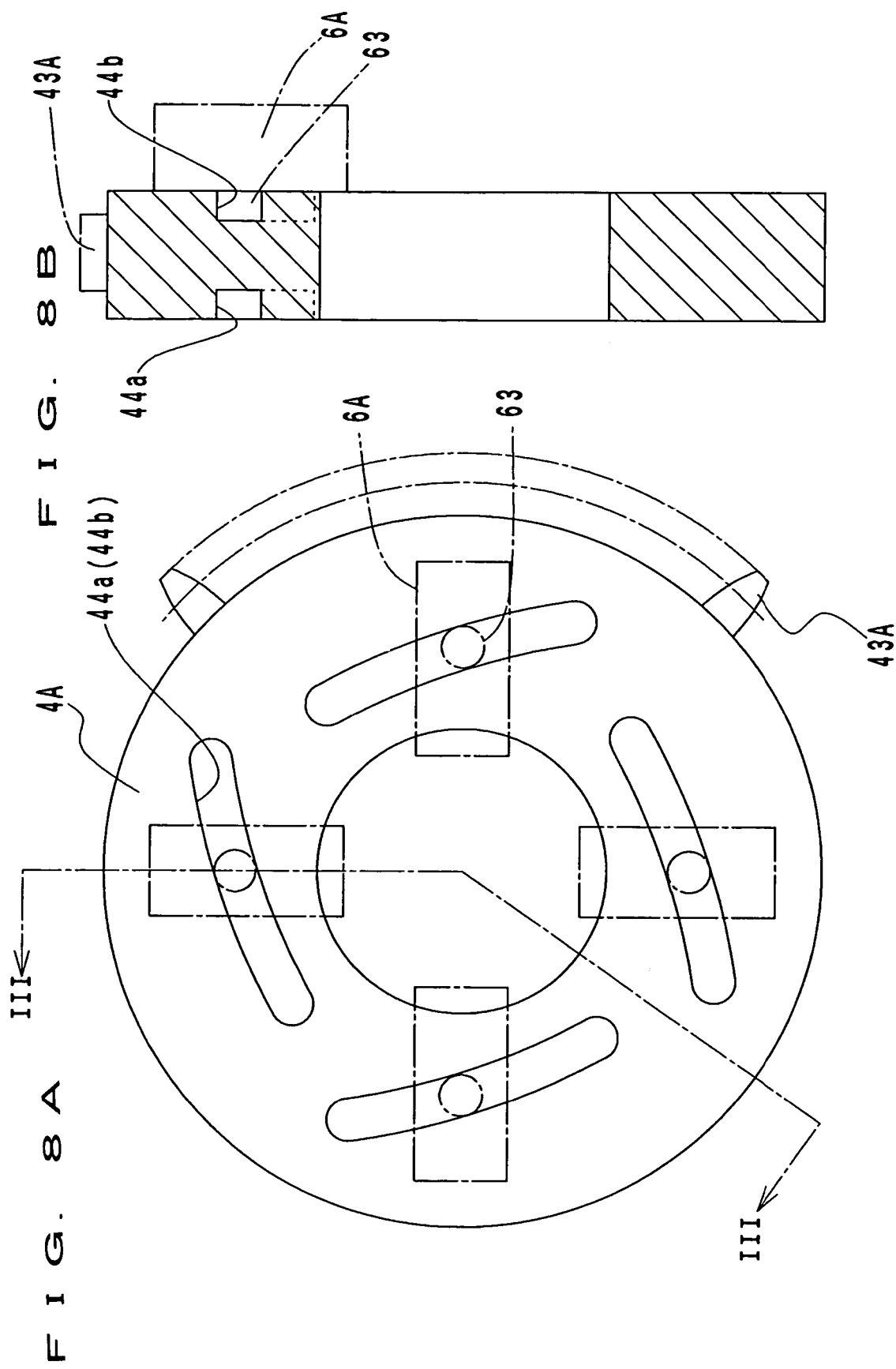

F I G. 1 1 (PRIOR ART)
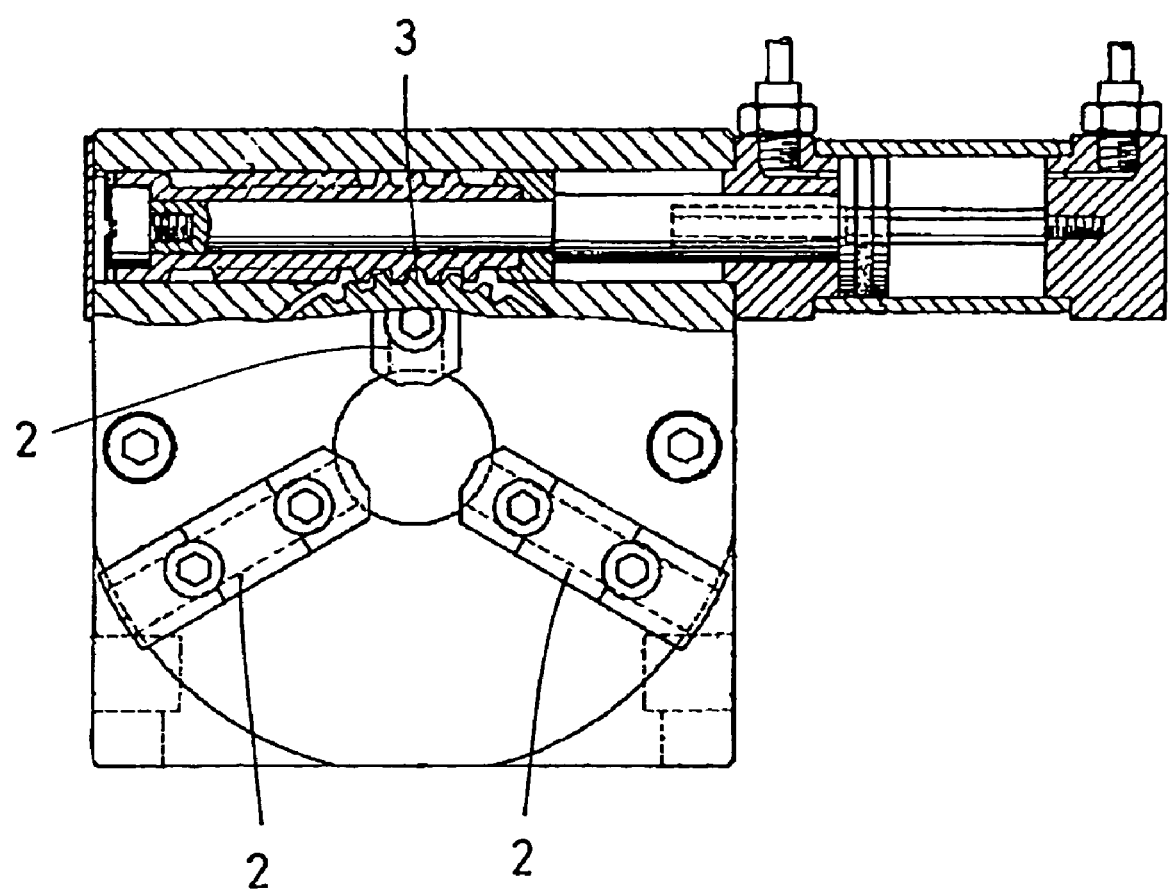

WORK FIXING DEVICE

BACKGROUND OF THE INVENTION

The present invention relates to a work fixing device, more specifically a work fixing device for gripping a work with circular section inserted in a hole formed in the main body of the work fixing device, comprising a plurality of clamps disposed movably along a guide groove formed in the radial direction in the main body of the work fixing device; and a clamp moving mechanism for synchronously moving the plurality of clamps in the radial direction.

Conventionally, when executing processing such as spinning, cutting, etc. on works with circular section (also including hollow works in tubular shape, in this specification), a variety of work fixing devices are used (JP 07-227733 A, for example), because of the necessity of fixing the work.

By the way, this type of work fixing device usually comprises, as shown in FIG. 11, a clamp moving mechanism 3 for moving a plurality of clamps 2. However, with this arrangement, in which the clamp is supported and moved by the moving mechanism 3 disposed on either the back face or a side face of the clamp 2, the fixing of work was liable to be limited only to the central part of the work or biased to one side.

For that reason, in the case of a long work or a work of soft metal such as aluminum, etc. or a hollow work in tubular shape with little rigidity, or in the case where the dimensional accuracy is rather low and variable, there was a problem that the work cannot be fixed accurately, eventually having negative influences on the working accuracy and operating efficiency.

SUMMARY OF THE INVENTION

The objective of the present invention, realized in view of such problems of the above-described conventional work fixing device, is to provide a work fixing device (i.e. a workpiece holding device) capable of stably fixing the work, without any biasing, in the longitudinal direction of the work, of the fastening force for fixing the work.

To achieve the above-mentioned objective, the work fixing device of this first invention is a work fixing device for gripping a work with circular section inserted in a hole formed in the main body of the work fixing device, comprising:

a plurality of clamps disposed movably along a guide groove formed in the radial direction in the main body of the work fixing device; and a clamp moving mechanism for synchronously moving the plurality of clamps in the radial direction, wherein said clamp moving mechanism is composed of a working disc forming a hole, in which to insert the work at the center, and a scroll guide in spiral shape on both sides from the center toward the outer circumference respectively;

a rotary drive mechanism for rotatably driving the working disc; and scroll pieces having a fitting portion to be engaged with the scroll guide of the working disc and disposed on both sides of the working disc in a way to correspond to a plurality of clamps respectively.

Moreover, to achieve the same objective, the work fixing device of this second invention is a work fixing device for gripping a work with circular section inserted in a hole formed in the main body of the work fixing device, comprising:

a plurality of clamps disposed movably along a guide groove formed in the radial direction in the main body of the work fixing device; and a clamp moving mechanism for synchronously moving the plurality of clamps in the radial direction, wherein said clamp moving mechanism is composed of a working disc forming a hole in which to insert the work at the center, and a cam groove in spiral shape on both sides from the center toward the outer circumference respectively;

a rotary drive mechanism for rotatably driving the working disc; and slide pieces having a fitting portion to be fit in the cam groove of the working disc and disposed on both sides of the working disc in a way to correspond to a plurality of clamps respectively.

In this case, it can be so arranged that the interval of the clamps disposed on both sides of the working disc may be a dimension larger than the diameter of the work.

Furthermore, it can be so arranged that the scroll pieces disposed on both sides of the working disc may be driven in linkage with one another.

Still more, it can be so arranged that the scroll pieces disposed on both sides of the working disc may be driven independently of one another.

According to the work fixing device of this first invention, by constructing the clamp moving mechanism with a working disc forming a hole, in which to insert the work at the center, and a scroll guide in spiral shape on both sides from the center toward the outer circumference respectively, a rotary drive mechanism for rotatably driving the working disc, and scroll pieces having a fitting portion to be engaged with the scroll guide of the working disc and disposed on both sides of the working disc in a way to correspond to a plurality of clamps respectively, the clamps come to be disposed on both sides of the working disc, and the fastening force for fixing the work is applied symmetrically across the working disc, thus enabling stable fixing the work without any biasing, in the longitudinal direction of the work, of the fastening force for fixing the work.

Moreover, according to the work fixing device of this second invention, by constructing the clamp moving mechanism with a working disc forming a hole in which to insert the work at the center, and a cam groove in spiral shape on both sides from the center toward the outer circumference respectively, a rotary drive mechanism for rotatably driving the working disc, and slide pieces having a fitting portion to be fit in the cam groove of the working disc and disposed on both sides of the working disc in a way to correspond to a plurality of clamps respectively, the clamps come to be disposed on both sides of the working disc, and the fastening force for fixing the work is applied symmetrically across the working disc, thus enabling stable fixing of the work without any biasing, in the longitudinal direction of the work, of the fastening force for fixing the work.

Furthermore, by setting the interval of the clamps disposed on both sides of the working disc for a dimension larger than the diameter of the work, it becomes possible to stably fix a long work or a work to be worked at both ends.

Moreover, by driving the scroll pieces disposed on both sides of the working disc in linkage with one another, it becomes possible to simplify the working disc and its rotary drive mechanism.

Additionally, by driving the scroll pieces disposed on both sides of the working disc independently of one another, it becomes possible to set the amount of movement of the clamps on both sides disposed on the scroll pieces independently for each side, and stably fix the work without any biasing, in the longitudinal direction of the work, of the fastening force for fixing the work, even in the case where the diameter is variable in the longitudinal direction or in the case of uneven works.

BRIEF DESCRIPTION OF THE DRAWINGS

FIG. 5A is a left side view of the disc for scroll, FIG. 5B is a front sectional view, and FIG. 5C is a left side view.

FIG. 7A is a front elevation of the first example of the mounting structure for clamp and scroll piece, FIG. 7B1 is a front elevation of the second example, and FIG. 7B2 is a right side view of the second example.

FIG. 8A is a left side view of the cam groove disc showing the second embodiment of the work fixing device according to the present invention, and FIG. 8B is a sectional view of the side face along the line III-III in FIG. 8A.

FIG. 11 is a front elevation showing the conventional work fixing device.

DETAILED DESCRIPTION OF THE INVENTION

Figure 1:
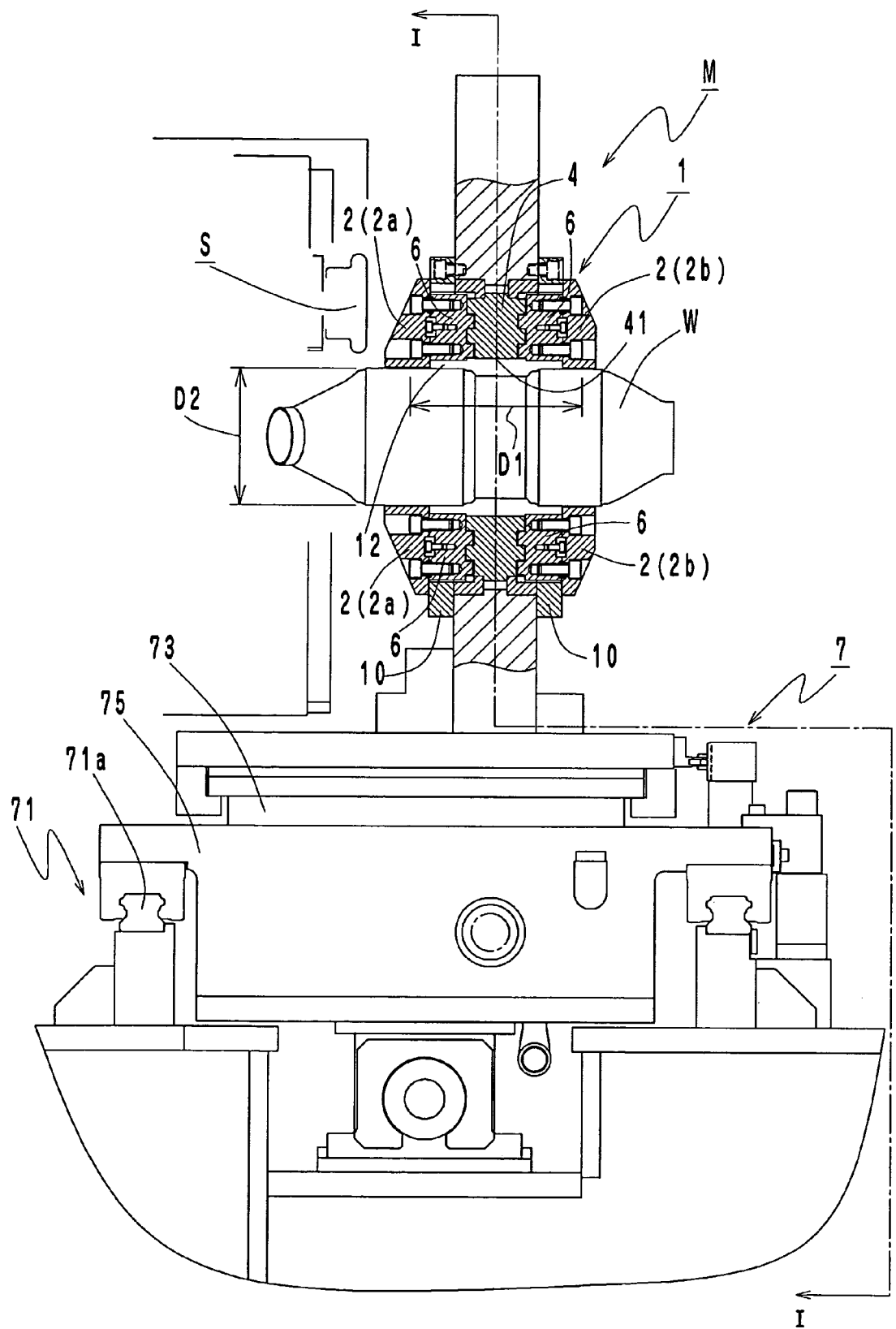
FIG. 1 is a sectional view of the front face showing the first embodiment of the work fixing device according to the present invention.

Embodiments of the work fixing device according to the present invention will be described below, with reference to drawings.

FIG. 1 to FIG. 7 show the first embodiment in which the work fixing device according to the present invention is applied to a device for spinning a work.

This work fixing device M is disposed in a way to face a spinning system S for executing drawing by spinning at both ends of the work W, which is, in this embodiment, a hollow work in tubular shape with a circular section forming a constriction in the intermediate part.

The work fixing device M, designed for gripping the work W with circular section inserted in a circular hole 12 formed on the main body 1 of work fixing device, comprises a plurality of clamps 2 disposed movably along a guide groove 11 formed in the radial direction in the main body 1 of the work fixing device, and a clamp moving mechanism 3 for synchronously moving the plurality of clamps 2 in the radial direction.

Figure 3:
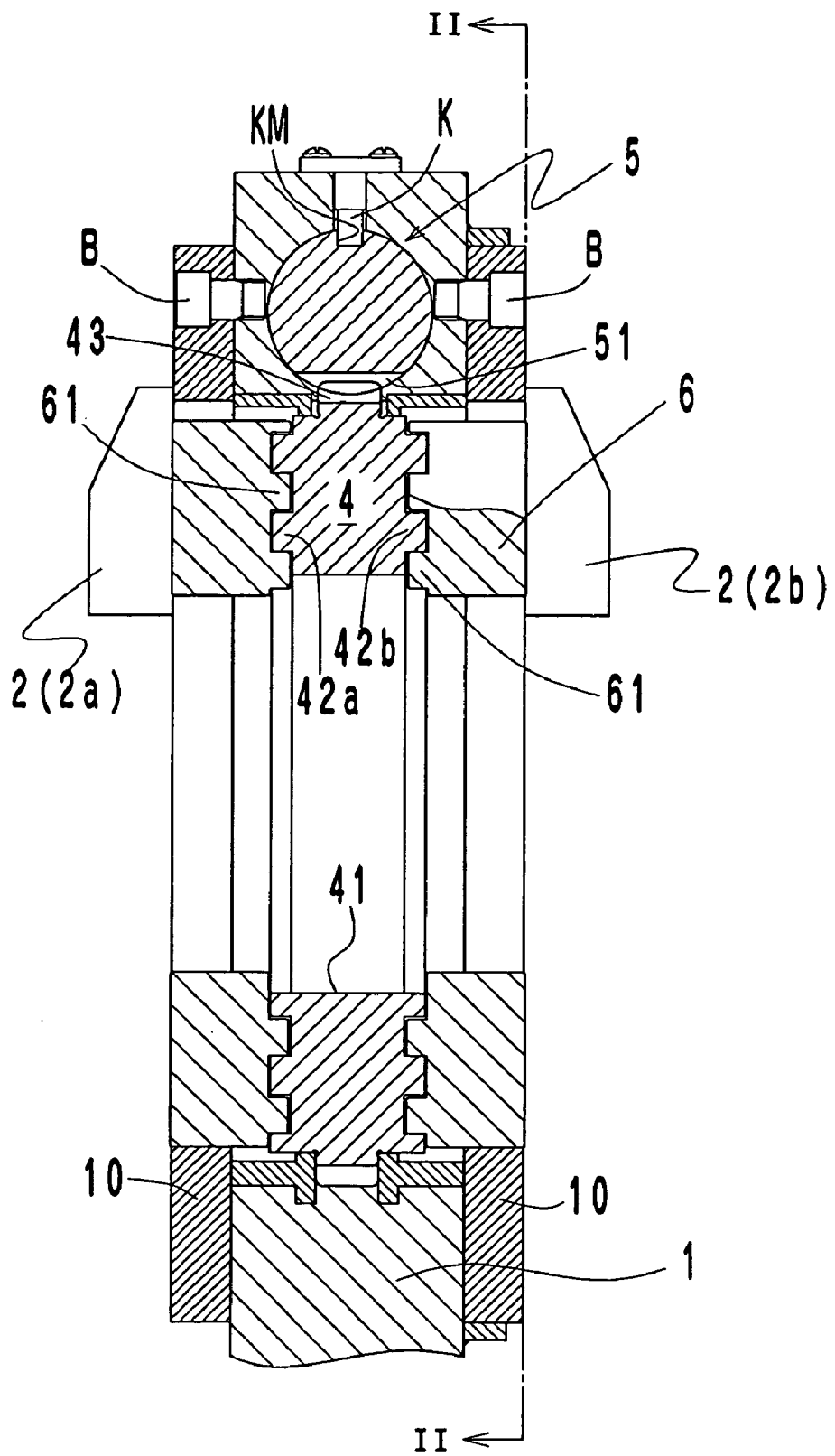
FIG. 3 is a sectional view of the front face showing the details of the clamp mounting structure.
Figure 4:
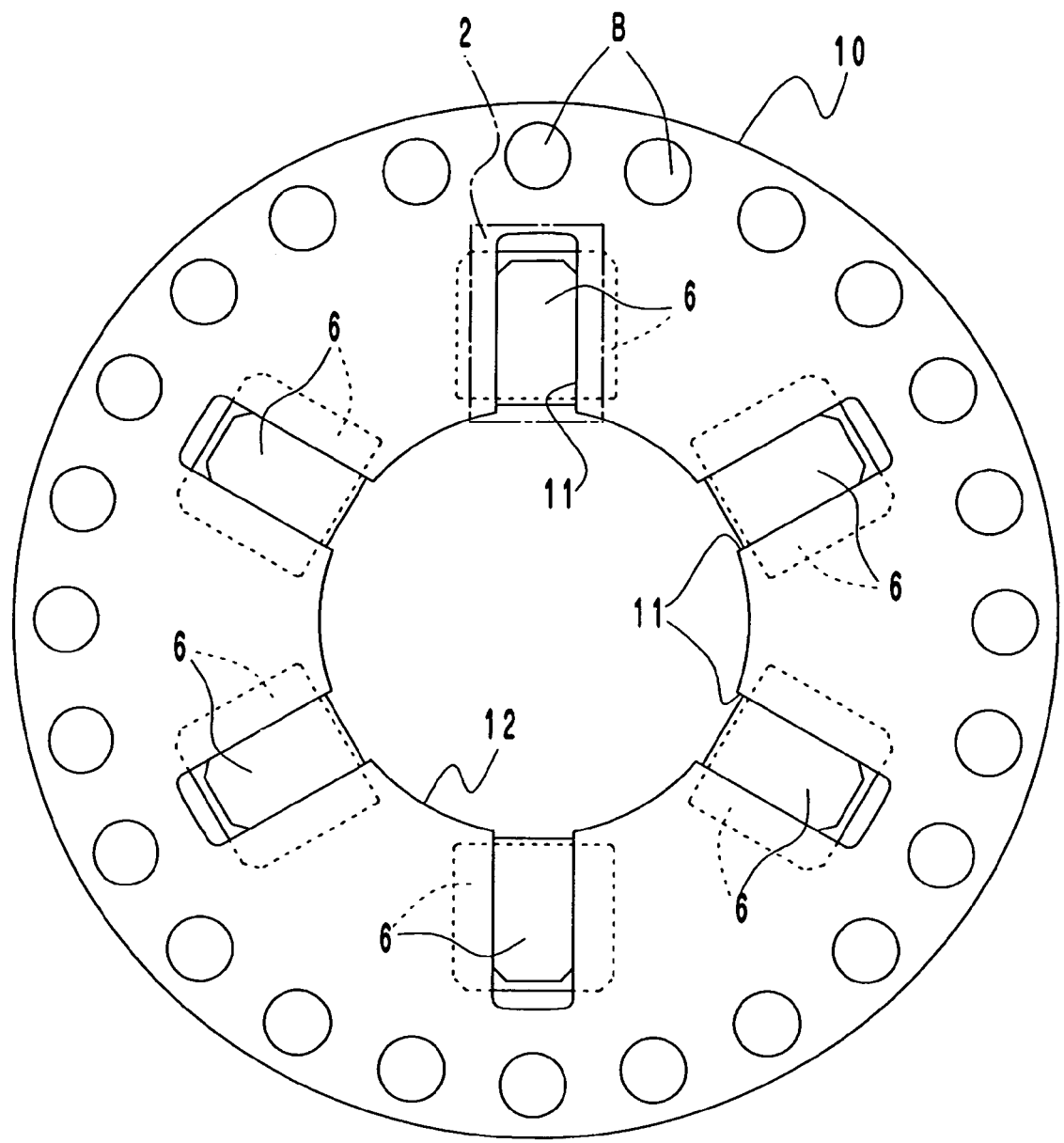
FIG. 4 is a side view along the line II-II in FIG. 3.

In this embodiment, a side disc 10 is fixed with a bolt B to the both side faces of the main body 1 of work fixing device, as shown in FIG. 3 and FIG. 4, forming a circular hole 12 at the center of this side disc 10, and forming a guide groove 11 so that the inner end side in radial direction may be continuous to this hole 12.

The clamp moving mechanism 3 is constructed by comprising a scroll disc 4 as working disc forming a circular hole 41 in which to insert the work W at the center and scroll guides 42a, 42b in spiral shape the winding direction of which is opposite to each other from the center toward the outer circumference on the both side faces, a rotary drive mechanism 5 for rotatably driving this scroll disc 4, and scroll pieces 6 having a fitting portion 61 to be engaged with the scroll guides 42a, 42b of the scroll disc 4 and disposed on both sides of the scroll disc 4 in a way to correspond to a plurality of clamps 2 (in FIG. 1, the clamp on the left side of the scroll disc 4 is named clamp 2a, and the clamp on the right side is named clamp 2b) respectively.

Here, the mounting of the clamp 2 to the scroll piece 6 is made by using an optional fastening means such as bolt, etc. At that time, it is desirable to accurately position the clamp 2 with a circular key 62 attached to the scroll piece 6.

In this case, the construction of the scroll guides 42a, 42b in spiral shape of the scroll disc 4 is made with up-down groove in spiral shape of left hand wind from the center toward the outer circumference, as shown in FIG. 5A, for one scroll guide 42a, and with up-down groove in spiral shape of right hand wind from the center toward the outer circumference, as shown in FIG. 5C, for the other scroll guide 42b.

The fitting portion 61, to be engaged with the scroll guides 42a, 42b of this scroll disc 4, made of the up-down groove of the scroll piece 6 on which to attach the clamp 2, is formed by changing the phase one after another, so that the tip of the clamp 2 attached to the scroll piece 6 may be positioned about on the concentric circle sharing the center with the circular hole 41 of the scroll disc 4.

Figure 2:
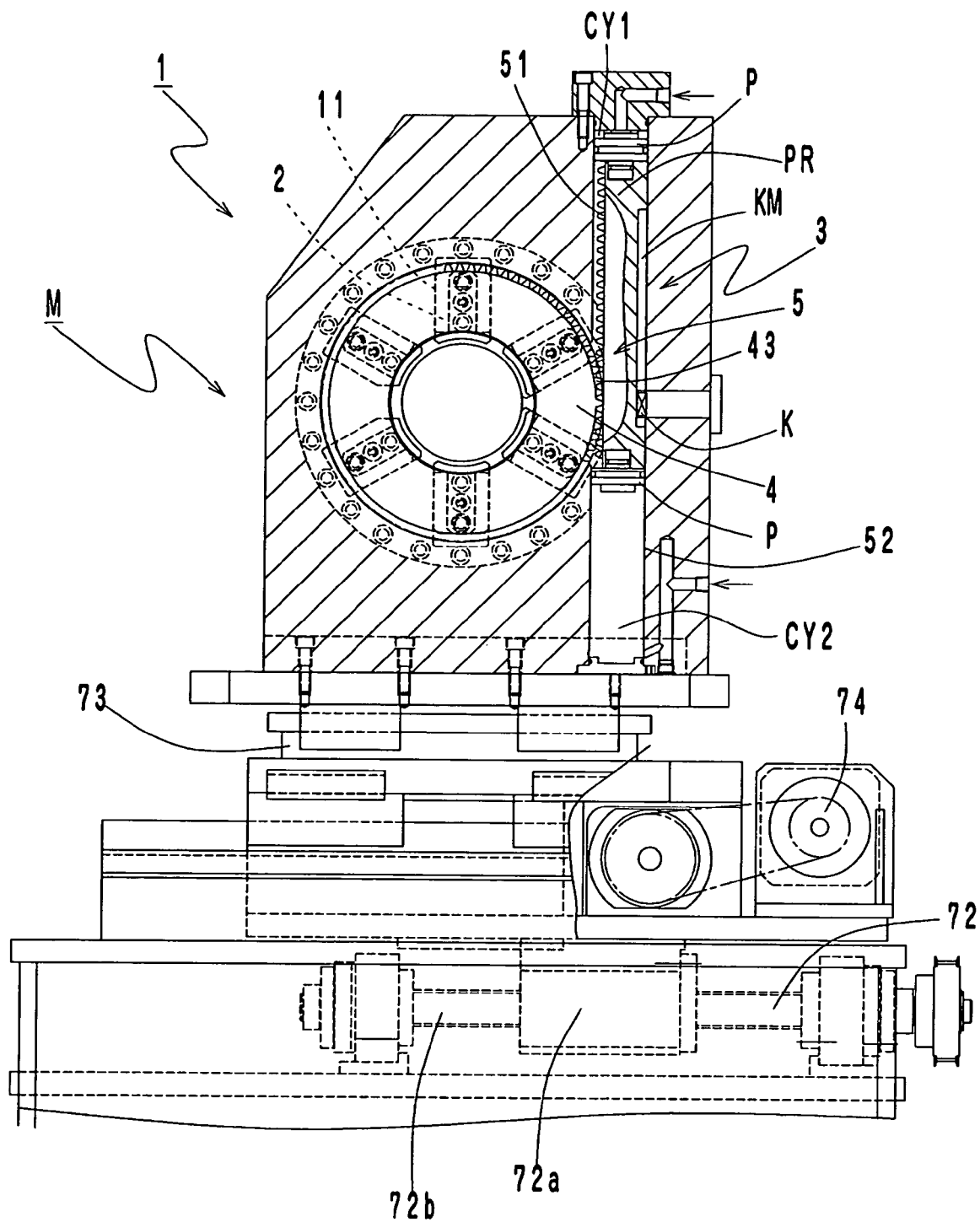
FIG. 2 is a partial sectional view of the side face along the line I-I in FIG. 1.

Moreover, in this construction, on the outer circumferential face of the scroll disc 4 is formed a gear 43 to be engaged with the rack gear 51 of the rotary drive mechanism 5 for rotatably driving the scroll disc 4, as shown in FIG. 2, so as to turn the scroll disc 4 by operating the rack gear 51 of the rotary drive mechanism 5 with a push-pull drive of the hydraulic cylinder 52 (sliding of piston rod PR) (or by rotatably driving the worm gear (not illustrated) with an optional rotary drive mechanism such as motor, etc. or by hand).

The rack gear 51 is formed on a piston rod PR provided in the piston P of the hydraulic cylinder 52, and the piston rod PR is made to slide in the hydraulic cylinder 52 without turning, by inserting a key K, disposed on the main body 1 of work fixing device, in the key groove KM formed in the piston rod PR. And, the sliding of the piston rod PR is made by selectively feeding an operating fluid to the cylinder chambers CY1, CY2 of the hydraulic cylinder 52. Furthermore, by blocking the hydraulic circuit leading to the cylinder chambers CY1, CY2 of the hydraulic cylinder 52, it becomes possible to fix the rotary drive mechanism 5 for rotatably driving the scroll disc 4, and maintain the gripping force of the clamp 2 in a steady state.

As a result, by rotatably driving the scroll disc 4 with the rotary drive mechanism 5, it becomes possible to move a plurality of clamps 2, movably disposed along the guide groove 11 formed in the radial direction on the main body 1 of work fixing device, in the radial direction synchronously through the scroll pieces 6, on both sides of the scroll disc 4, because the scroll guides 42a, 42b in spiral shape formed on both side faces of the scroll disc 4 are spiraled in directions opposite to each other, thus enabling either fixing the work W with the clamp 2 or releasing the work W by the clamp 2.

By the way, in this embodiment, the interval D1 of the clamps 2 disposed on both sides of the scroll disc 4 through scroll pieces 6 is set for a dimension no less than the diameter D2 of the work W. This enables to stable fixing of a long work or a work to be worked at both ends, by forming a constriction in the intermediate part, as shown in this embodiment.

Figure 6:
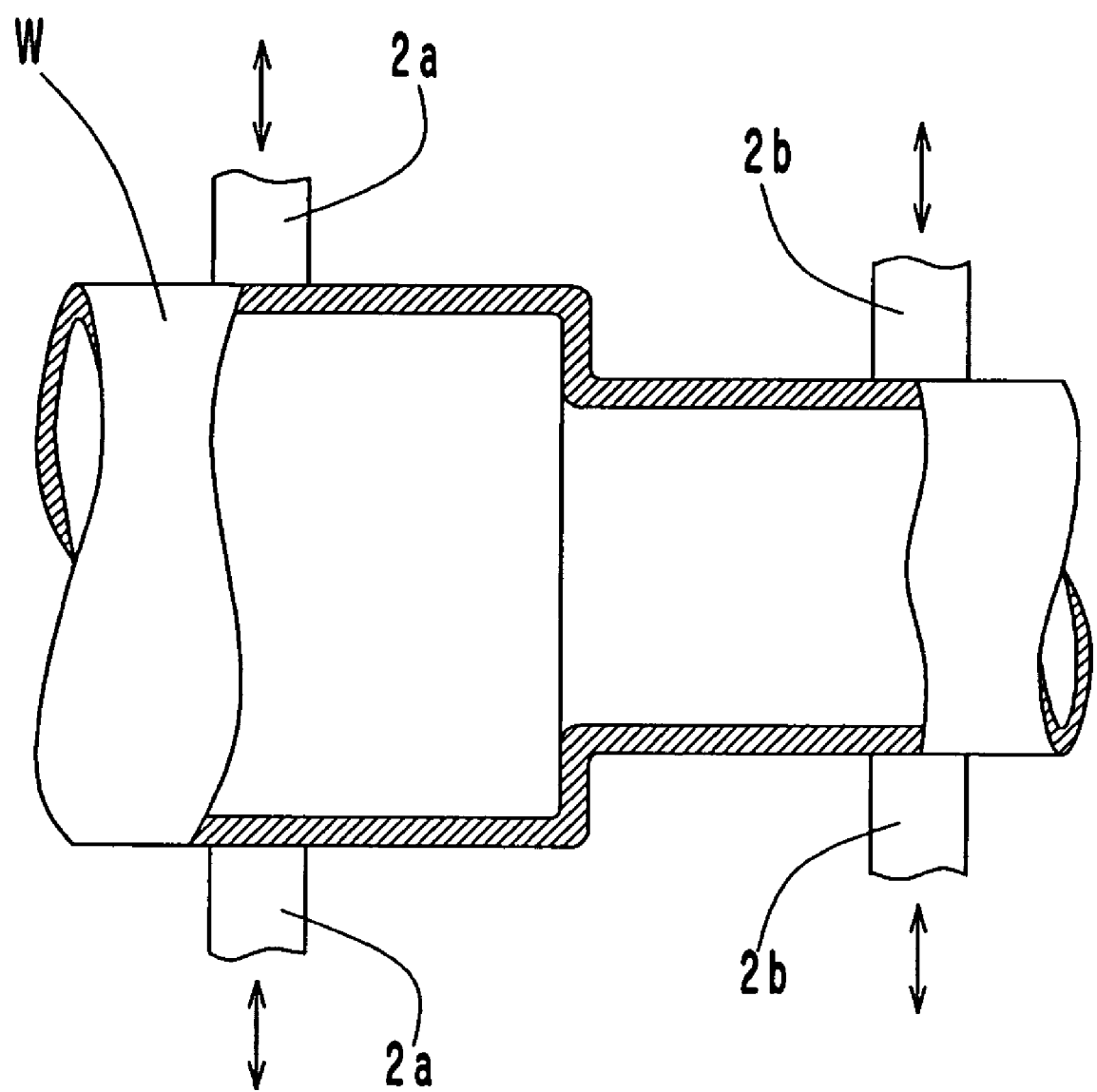
FIG. 6 is an explanatory drawing showing an example of the state of gripping of work by the clamp.

Furthermore, when fixing a work (stepped pipe) W having a difference of diameter at gripping positions, as shown in FIG. 6, in the state in which the fitting portion 61 of the scroll piece 6 is engaged with the scroll guides 42a, 42b of the scroll disc 4, remove the bolt B of the side disc 10 on one side, the side disc 10 on the right side in FIG. 3, for example, and turn the side disc 10 by a desired amount, and only the clamp 2b on the right side in FIG. 3 will be displaced in the radial direction (at that time, the clamp 2a on the left side in FIG. 3 is not displaced). If the side disc 10 is fixed at this position after displacement, the clamp 2a and the clamp 2b are displaced away from each other in the radial direction, enabling accurate gripping of a work (stepped pipe) W having a difference of diameter at gripping positions as in FIG. 6.

In addition, as a method for disposing the clamp 2a and the clamp 2b deviated from each other, there is a method which consists in changing the mounting position of the clamps 2 against the scroll pieces 6. To be concrete, the mounting position of the clamps 2 against the scroll pieces 6 can be changed, by either rotatably displacing the clamp 2b-1 against the scroll pieces 6, as shown in FIG. 7A, thereby shifting the mounting position of the clamp 2 against the scroll pieces 6 by an amount equal to the difference between the dimension L1 and the dimension L2, or by slidably displacing the clamp 2b-2 against the scroll pieces 6, as shown in FIG. 7B, thereby shifting the mounting position of the clamp 2 against the scroll pieces 6 by an amount equal to the dimension L3. In FIG. 7B, DB is a bolt on which is formed a stepped part D, LS is a long slit, and H is a concave part in which is engaged the stepped part D.

At the base 7 of the work fixing device M are disposed, as shown in FIG. 1 and FIG. 2, a horizontal moving mechanism 71 for moving the upper structure of the work fixing device M in the horizontal direction orthogonal to the working axis (center axis of the work W) of the spinning system S, and the drive system 72 for it, as well as a rotating mechanism 73 for turning the upper structure around a vertical axis, and the drive system 74 for it respectively.

The horizontal moving mechanism 71 and the drive system 72 have a nut 72a for ball screw fixed to the bottom part of the table 75 in which are placed the upper structure of the work fixing device M and a ball screw 72b to be engaged therewith disposed in parallel to the guide rail 71a of the horizontal moving mechanism 71, and is rotatably supported by a servo motor (not illustrated). This makes it possible to move the table 75 in the horizontal direction orthogonal to the working axis (center axis of the work W) of the spinning system S, by rotatably turning the ball screw 72b with the servo motor of the drive system 72.

Moreover, the rotating mechanism 73 and the drive system 74, disposed on the table 75, are constructed in a way to turn the upper structure of the work fixing device M around a vertical axis.

This makes it possible to rotatably drive the upper structure of the work fixing device M around a vertical axis with the drive system 74, and turn the direction of the upper structure by 180, for example, thus enabling drawing by spinning at both ends of the work W with a single unit of spinning system S, while fixing the work W with the work fixing device M, without making any change of gripping.

This work fixing device M, wherein the clamp moving mechanism 3 is constructed by comprising a scroll disc 4 as working disc forming a circular hole 41 in which to insert the work W at the center and scroll guides 42a, 42b in spiral shape the winding direction of which is opposite to each other from the center toward the outer circumference on the both side faces, a rotary drive mechanism 5 for rotatably driving this scroll disc 4, and scroll pieces 6 having a fitting portion 61 to be engaged with the scroll guides 42a, 42b of the scroll disc 4 and disposed on both sides of the scroll disc 4 in a way to correspond to a plurality of clamps 2 respectively, can stably fix the work W, without any biasing, in the longitudinal direction of the work W, of the fastening force for fixing the work W, because the clamp 2 is disposed on both sides of the scroll disc 4 and the fastening force for fixing the work W is applied symmetrically across the working disc 4.

By the way, while in the above-described first embodiment, the working disc is composed of a scroll disc 4, this working disc may be composed of a cam groove disc 4A forming cam grooves 44a, 44b in spiral shape on both side faces spiraled in opposite directions from the center toward the outer circumference, as in the second embodiment shown in FIG. 8, in place of this scroll disc 4.

In this embodiment, the projection (cam follower) 63 to be fit in the cam grooves 44a, 44b is provided in protrusion on the slide piece 6A, to rotatably drive, through the gear 43A, the cam groove disc 4A with a proper drive mechanism (not illustrated), so as to synchronously move, through the slide piece 6A, a plurality of clamps 2 disposed movably along the guide groove 11 formed in the radial direction in the main body 1 of the work fixing device, in the same way as in the first embodiment, thus enabling either fix the work W with the clamps 2 or release the fixing of the work W by the clamps 2.

Other constructions and actions of this embodiment are identical to those of the first embodiment explained above.

Moreover, in the above-described first embodiment, the scroll disc (working disc) 4 as moving mechanism 3 of the clamps 2 is composed of a single-piece member, and this scroll disc 4 is rotatably driven by a single rotary drive mechanism 5, to drive the scroll pieces 6, 6 disposed on both sides of the scroll disc 4 in linkage with each other, so as to align at both ends the amount of movements of the clamps 2a, 2b on both sides disposed on the scroll pieces 6, 6. However, it is also all right to drive the scroll pieces 6, 6 disposed on both sides of the scroll disc 4 independently on each side, in place of above, as in the third embodiment shown in FIG. 9 and FIG. 10, thus enabling setting of the amount of movement of the clamps 2a, 2b on both sides disposed on the scroll pieces 6, 6 independently on each side.

Figure 9A:
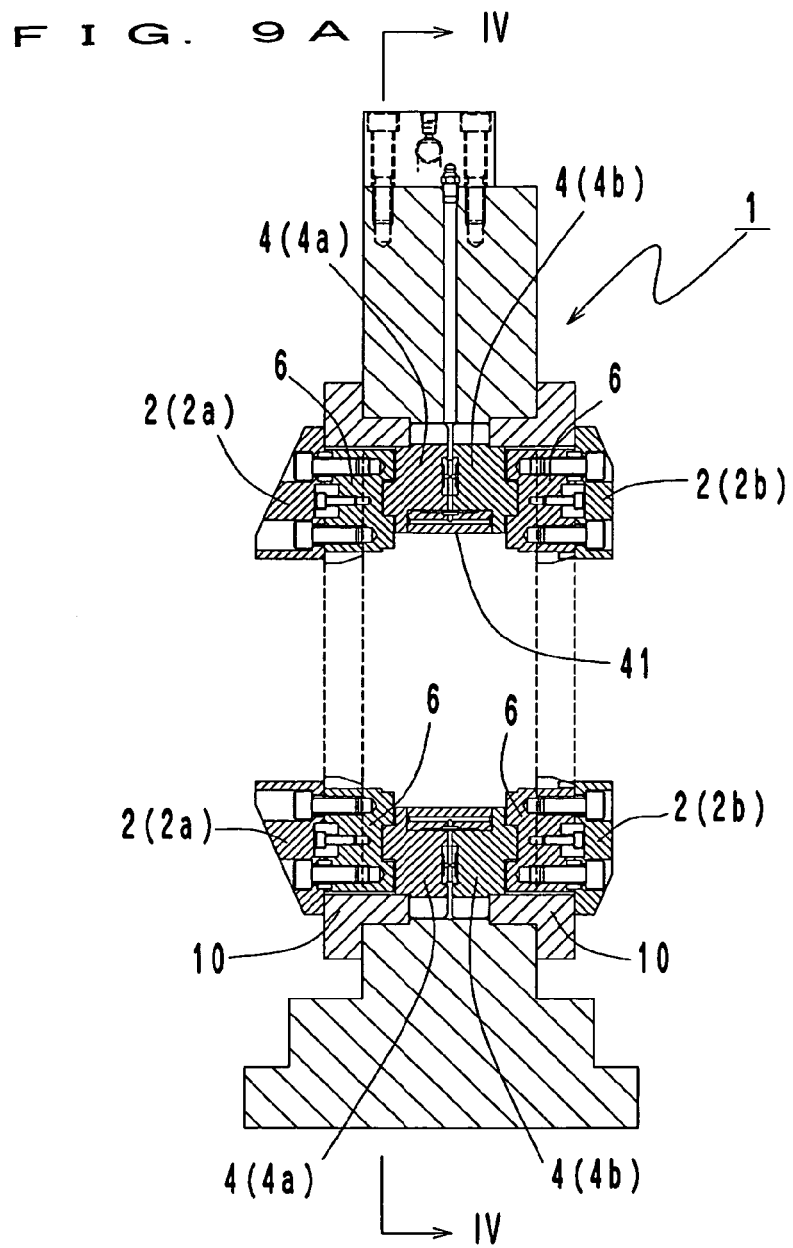
FIG. 9A is a sectional view of the front face showing the third embodiment of the work fixing device according to the present invention.
Figure 9B:
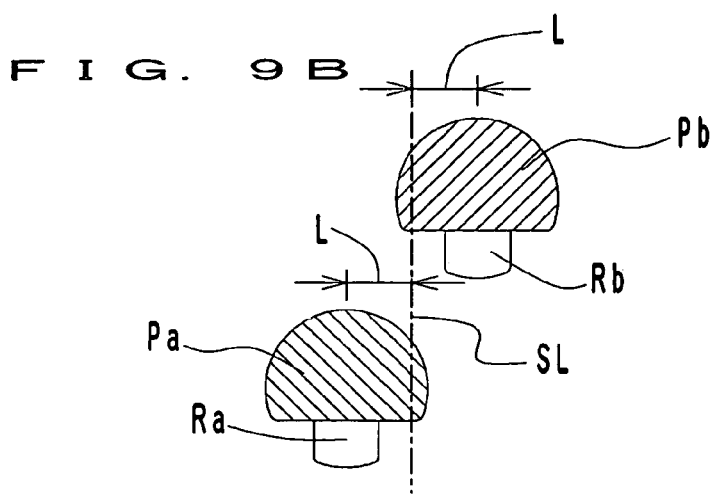
FIG. 9B is an expanded sectional view of the rotary drive mechanism of the scroll disc.

More specifically, in this first embodiment, the scroll disc 4 as moving mechanism 3 (3a, 3b) of the clamps 2 is split into 2 parts i.e. scroll disc 4a on the left side and scroll disc 4b on the right side jointed to each other at one side face, as shown in FIG. 9, and these scroll discs 4a, 4b are rotatably driven by separate rotary drive mechanisms 5a, 5b respectively, to enable to drive the scroll pieces 6, 6 disposed on both sides of the scroll discs 4a, 4b independently on each side.

Figure 10:
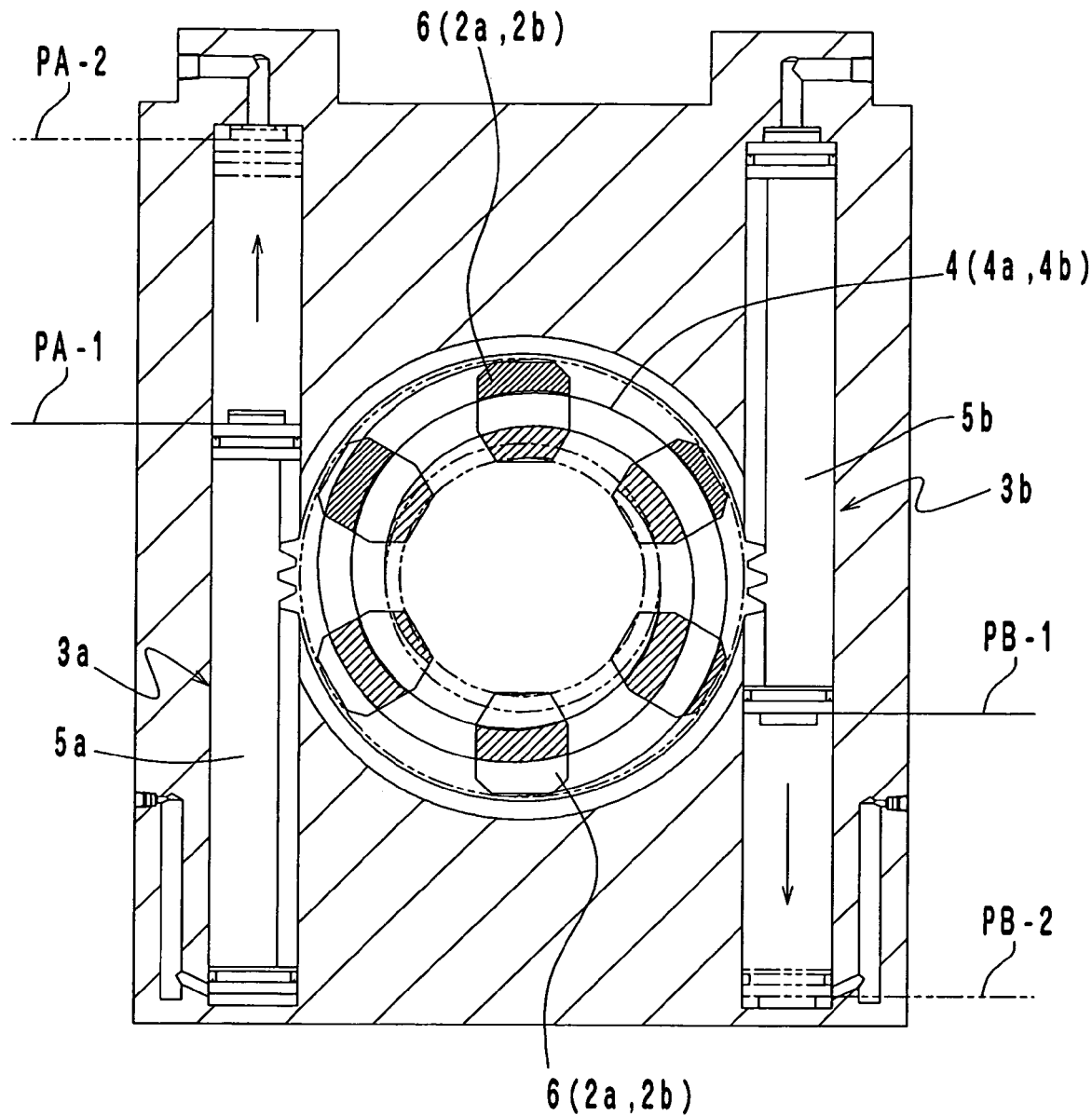
FIG. 10 is a partial sectional view of the side face along the line IV-IV in FIG. 9A.

And, as shown in FIG. 9 and FIG. 10, it is so arranged that the scroll discs 4a, 4b are rotatably driven by the rotary drive mechanisms 5a, 5b at two points in the direction of diameter. To be concrete, the scroll disc 4a is pushed and turned upward (PA-1→PA-2) by the rotary drive mechanism 5a, and the scroll disc 4b is pushed and turned downward (PB-1→PB-2) by the rotary drive mechanism 5b, to drive the scroll pieces 6, 6 disposed on both sides of the scroll discs 4a, 4b independently on each side. This presents an advantage of reducing the influences of the load due to rotary drive mechanisms 5a, 5b on the side disc 10 providing a bearing function to the scroll discs 4a, 4b and the bearing on the inner circumferential side constituting the hole 41, compared with the case in which the scroll discs 4a, 4b are rotatably driven downward together (or upward together) by the rotary drive mechanisms 5a, 5b at two points in the direction of diameter.

Furthermore, the pistons Pa, Pb of the rotary drive mechanisms 5a, 5b of the scroll discs 4a, 4b are offset by a distance L on both sides from the center line SL constituting the jointing face of the scroll discs 4a, 4b, and the rack teeth Ra, Rb are cut off on both sides to avoid interference.

The rotary drive mechanisms 5a, 5b of the scroll discs 4a, 4b may take an optional construction of disposition other than that disposing face to face at two points in the direction of diameter of the scroll discs 4a, 4b, such as disposing rotary drive mechanism 5a and the rotary drive mechanism 5b in the perpendicular direction, for example, as shown in this embodiment.

Still more, for the rotary drive mechanisms 5a, 5b of the scroll discs 4a, 4b, it is also all right to use any optional drive source other than the rodless cylinder as shown in this embodiment, such as ordinary cylinder having piston rod, for example, to drive the rack teeth Ra, Rb, through a drive force transfer mechanism.

And, by enabling the amount of movement of the clamps 2a, 2b on both sides to be set independently for each side, it becomes possible to stably fix the work W without any biasing, in the longitudinal direction of the work W, of the fastening force for fixing the work W, even in the case where the diameter is variable in the longitudinal direction or in the case of an uneven work W.

Other constructions and actions of this embodiment are identical to those of the first embodiment described above.

Explanation has so far been made on the work fixing device of the present invention, based on embodiments in which the work fixing device is applied to a system for executing spinning on the work. However, the present invention is not restricted to the constructions described in the above-mentioned embodiments, but may allow changes to its construction as necessary in the range not deviating from its purpose, such as combining the constructions described in the respective embodiments as desired or using fixing device in processing other than spinning and cutting, etc.

The work fixing device of the present invention, capable of stably fixing the work, without any biasing in the longitudinal direction of the work, can be suitably used for applications of fixing the work, in the case executing processing such as spinning, cutting, etc. on the works of a variety of shapes and properties.

What is claimed is:

1. A workpiece fixing device for gripping a workpiece having a circular cross section, the workpiece fixing device comprising:
    a main body having a hole formed therein, the main body being configured such that the workpiece is insertable in the hole;
    a plurality of guide grooves formed in the main body and extending in a plurality of radial directions, respectively;
    a plurality of clamps disposed movably along the plurality of guide grooves, respectively, for exerting gripping force on the workpiece, said plurality of clamps including a first set of clamps and a second set of clamps, said first set of clamps being spaced from said second set of clamps in a direction perpendicular to the plurality of radial directions; and
    a clamp moving mechanism for moving the plurality of clamps in the plurality of radial directions, respectively, wherein said clamp moving mechanism includes a rotary drive mechanism and a plurality of scroll pieces, wherein the rotary drive mechanism includes
        (i) a first working disc and a second working disc, the hole of the main body extending through each of the first working disc and the second working disc,
        (ii) a first scroll guide rotatably supported on the main body, the first scroll guide having a spiral shape,
        (iii) a second scroll guide rotatably supported on the main body, the second scroll guide having a spiral shape,
        (iv) a first hydraulic cylinder rotatably driving the first working disc in a rotational direction to maintain the gripping force of the first set of clamps on the workpiece, and
        (v) a second hydraulic cylinder rotatably driving the second working disc in the rotational direction to maintain the gripping force of the second set of clamps on the workpiece,
    wherein the first hydraulic cylinder and the second hydraulic cylinder are configured to rotatably drive the first and second working discs independently of each other,
    wherein each scroll piece of the plurality of scroll pieces has a fitting portion engaging one of the first scroll guide and the second scroll guide, and
    wherein each scroll piece of the plurality of scroll pieces corresponds to a clamp of the plurality of clamps.

2. The workpiece fixing device of claim 1, wherein the plurality of scroll pieces are disposed in the plurality of guide grooves, respectively, and
    wherein said plurality of clamps is operably connected to said plurality of scroll pieces, respectively, such that said plurality of clamps move with said plurality of scroll pieces to grip the workpiece.

3. The workpiece fixing device of claim 2, wherein each of said first scroll guide and said second scroll guide constitute a cam groove,
    wherein each scroll piece of said plurality of scroll pieces constitutes a slide piece slidable with one of the cam grooves, and
    wherein the fitting portions of each of the slide pieces fits in one of the cam grooves.

4. The workpiece fixing device of claim 2, wherein each of said first scroll guide and said second scroll guide constitute a cam groove,
    wherein each scroll piece of said plurality of scroll pieces constitutes a slide piece slidable with one of the cam grooves,
    wherein the fitting portions of each of the slide pieces fits in one of the cam grooves, and
    wherein the slide pieces are disposed on each side of the first and second working discs.

5. The workpiece fixing device of claim 1, wherein each of said first scroll guide and said second scroll guide constitute a cam groove,
    wherein each scroll piece of said plurality of scroll pieces constitutes a slide piece slidable with one of the cam grooves, and
    wherein the fitting portions of each of the slide pieces fits in one of the cam grooves.

6. The workpiece fixing device of claim 1, wherein each of said first scroll guide and said second scroll guide constitute a cam groove,
    wherein each scroll piece of said plurality of scroll pieces constitutes a slide piece slidable with one of the cam grooves,
    wherein the fitting portions of each of the slide pieces fits in one of the cam grooves, and
    wherein the slide pieces are disposed on each side of the first and second working discs.

7. A workpiece fixing device for gripping a workpiece having a circular cross section, the workpiece fixing device comprising:

a main body having a hole formed therein, the main body being configured such that the workpiece is insertable in the hole;

a plurality of guide grooves formed in the main body and extending in a plurality of radial directions, respectively;

a plurality of clamps disposed movably along the plurality of guide grooves, respectively, for exerting gripping force on the workpiece, said plurality of clamps including a first set of clamps and a second set of clamps, said first set of clamps being spaced from said second set of clamps in a direction perpendicular to the plurality of radial directions; and a clamp moving mechanism for moving the plurality of clamps in the plurality of radial directions, respectively, to grip the workpiece, wherein said clamp moving mechanism includes a rotary drive mechanism and a plurality of scroll pieces, wherein the rotary drive mechanism includes (i) a first working disc and a second working disc, the hole of the main body extending through each of the first working disc and the second working disc, each of the first working disc and the second working disc being rotatable in a rotational direction, (ii) a first scroll guide rotatable with the first working disc, the first scroll guide having a spiral shape extending from a center of the first working disc toward an outer circumference of the first working disc, (iii) a second scroll guide rotatable with the second working disc, the second scroll guide having a spiral shape extending from a center of the second working disc toward an outer circumference of the second working disc, (iv) a first hydraulic cylinder rotatably driving the first working disc in the rotational direction to maintain the gripping force of the first set of clamps on the workpiece, and (v) a second hydraulic cylinder rotatably driving the second working disc in the rotational direction to maintain the gripping force of the second set of clamps on the workpiece, wherein the first hydraulic cylinder and the second hydraulic cylinder are configured to rotatably drive the first and second working discs independently of each other, wherein each scroll piece of the plurality of scroll pieces has a fitting portion engaging one of the first scroll guide and the second scroll guide such that rotation of the first scroll guide and second scroll guide moves the plurality of scroll pieces in the plurality of radial directions, respectively, and wherein said plurality of clamps is operably connected to said plurality of scroll pieces, respectively, such that said plurality of clamps move with said plurality of scroll pieces to grip the workpiece.

8. The workpiece fixing device of claim 7, wherein the plurality of scroll pieces are disposed in the plurality of guide grooves, respectively.

9. The workpiece fixing device of claim 8, wherein each of said first scroll guide and said second scroll guide constitute a cam groove, wherein each scroll piece of said plurality of scroll pieces constitutes a slide piece slidable with one of the cam grooves, and wherein the fitting portions of each of the slide pieces fits in one of the cam grooves.

10. The workpiece fixing device of claim 8, wherein each of said first scroll guide and said second scroll guide constitute a cam groove, wherein each scroll piece of said plurality of scroll pieces constitutes a slide piece slidable with one of the cam grooves, wherein the fitting portions of each of the slide pieces fits in one of the cam grooves, and wherein the slide pieces are disposed on each side of the first and second working discs.

11. The workpiece fixing device of claim 7, wherein each of said first scroll guide and said second scroll guide constitute a cam groove, wherein each scroll piece of said plurality of scroll pieces constitutes a slide piece slidable with one of the cam grooves, and wherein the fitting portions of each of the slide pieces fits in one of the cam grooves.

12. The workpiece fixing device of claim 7, wherein each of said first scroll guide and said second scroll guide constitute a cam groove, wherein each scroll piece of said plurality of scroll pieces constitutes a slide piece slidable with one of the cam grooves, wherein the fitting portions of each of the slide pieces fits in one of the cam grooves, and wherein the slide pieces are disposed on each side of the first and second working discs.

* * * * *